(12) United States Patent
Takahashi

(10) Patent No.: US 8,066,438 B2
(45) Date of Patent: Nov. 29, 2011

(54) CAMERA APPARATUS

(75) Inventor: Yasuhide Takahashi, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 0 days.

(21) Appl. No.: 12/833,289

(22) Filed: Jul. 9, 2010

(65) Prior Publication Data

US 2011/0013900 A1 Jan. 20, 2011

(30) Foreign Application Priority Data

Jul. 14, 2009 (JP) ................................ 2009-165457

(51) Int. Cl.
*G03B 17/00* (2006.01)
*H04N 7/18* (2006.01)
(52) U.S. Cl. ....................... 396/427; 348/143
(58) Field of Classification Search ................. 396/427, 396/428, 419, 535; 348/143, 427, 428, 373–374
See application file for complete search history.

(56) References Cited

U.S. PATENT DOCUMENTS 6,860,654 B1 * 3/2005 Ching-Wen .................... 396/427
7,586,537 B2 9/2009 Konishi et al.

FOREIGN PATENT DOCUMENTS

| CN | 201163795 (Y) | 12/2008 |
| JP | 11-243500 A | 9/1999 |
| JP | 2005-221637 A | 8/2005 |

* cited by examiner

*Primary Examiner* — W. B. Perkey
*Assistant Examiner* — Minh Phan
(74) *Attorney, Agent, or Firm* — Foley & Lardner LLP

(57) ABSTRACT

A camera apparatus includes an adjusting member configured to adjust a pan of an optical member included therein; a cover member configured to cover the optical member; and a fixing member fixed to an installation surface and configured to include a first engaging mechanism and a second engaging mechanism for respectively engaging the adjusting member and the cover member thereto. The pan of the optical member is adjusted by respectively engaging a groove or a protrusion of the first engaging mechanism and protrusion or a groove of the adjusting member, and rotating the adjusting member along the groove. The cover member is locked to the fixing member by respectively engaging a groove or a protrusion of the second engaging mechanism and a protrusion or groove of the cover member, and rotating the cover member a given angle along the groove.

10 Claims, 17 Drawing Sheets

ENLARGED VIEW OF F PORTION

ENLARGED VIEW OF G PORTION

CAMERA APPARATUS

CROSS-REFERENCE TO RELATED APPLICATIONS

The present document incorporates by reference the entire contents of Japanese priority document, 2009-165457 filed in Japan on Jul. 14, 2009.

BACKGROUND OF THE INVENTION

1. Field of the Invention

The present invention relates to a camera apparatus.

2. Description of the Related Art

Conventional surveillance dome camera apparatuses generally have a configuration in which a cover member that covers an optical member is fixed to an adjusting member that adjusts the pan of the optical member (see, for example, Japanese Laid-Open Patent Application No. H11-243500). In many cases, the cover member is engaged with the adjusting member, rotated with respect to the adjusting member, and locked at a given angle so that the cover member is easily attached to/detached from the adjusting member. In some cases, the cover member is attached to the adjusting member by screw members (see, for example, Japanese Laid-Open Patent Application No. 2005-221637).

However, in the conventional arts described above, when the cover member is rotated to be fixed to the adjusting member, the adjusting member also rotates along with the cover member, requiring re-positioning and re-adjustment of the adjusting member, resulting in inefficient assembly and installation.

Although configurations in which the cover member is fixed by the screw members mitigate this problem, the screw member protrudes exteriorly, resulting in a larger overall size of the camera apparatus, an unfavorable appearance, and a greater number of elements.

SUMMARY OF THE INVENTION

It is an object of the present invention to at least solve the above problems in the conventional technologies.

A camera apparatus according to one aspect of the present invention includes an adjusting member configured to adjust a pan of an optical member included therein; a cover member configured to cover the optical member; and a fixing member fixed to an installation surface and configured to include a first engaging mechanism and a second engaging mechanism for respectively engaging the adjusting member and the cover member thereto. The pan of the optical member is adjusted by respectively engaging a groove or a protrusion of the first engaging mechanism and protrusion or a groove of the adjusting member, and rotating the adjusting member along the groove. The cover member is locked to the fixing member by respectively engaging a groove or a protrusion of the second engaging mechanism and a protrusion or groove of the cover member, and rotating the cover member a given angle along the groove.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
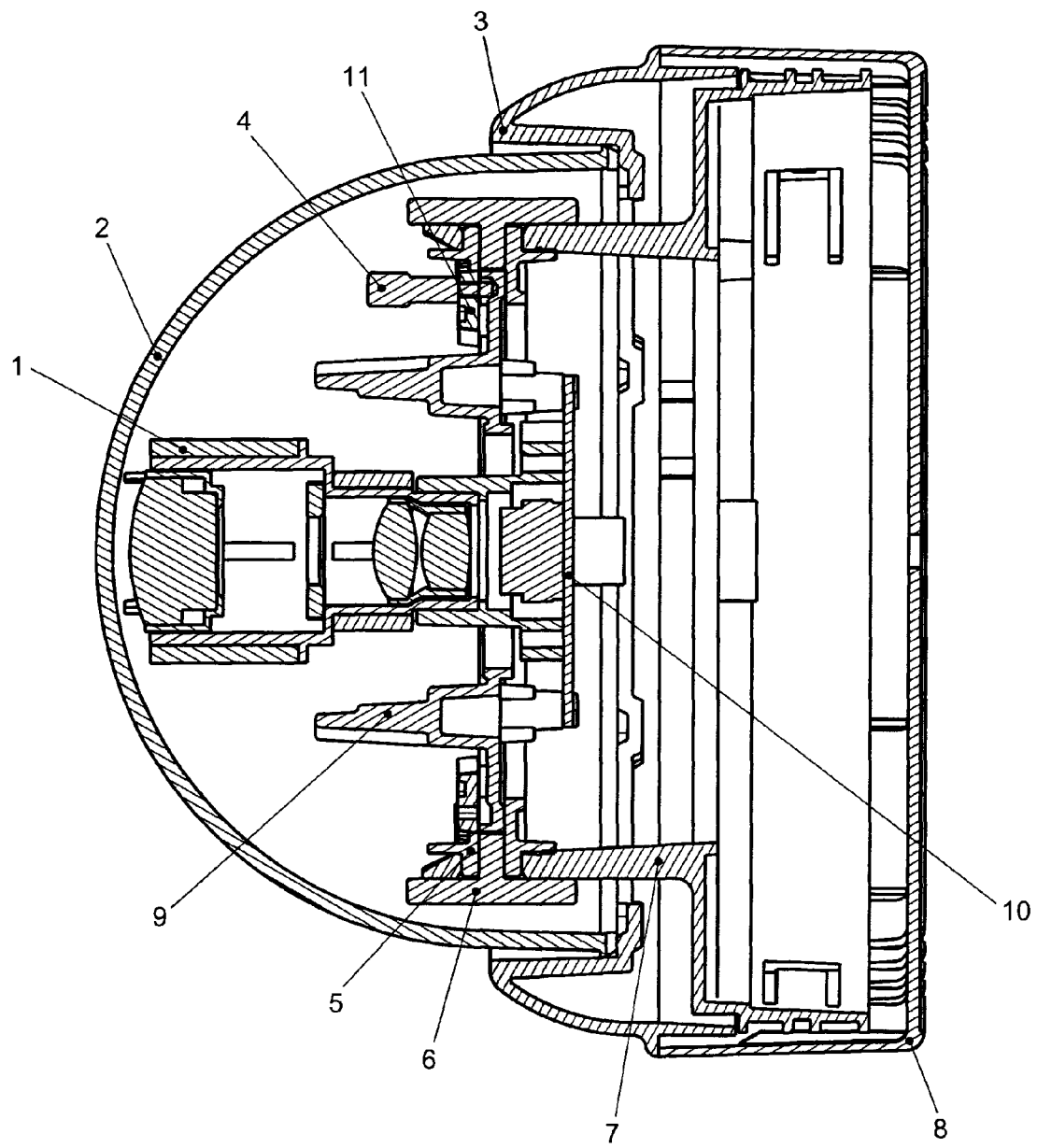
FIG. 1 is a cross sectional view of a camera apparatus according to a first embodiment.
Figure 2:
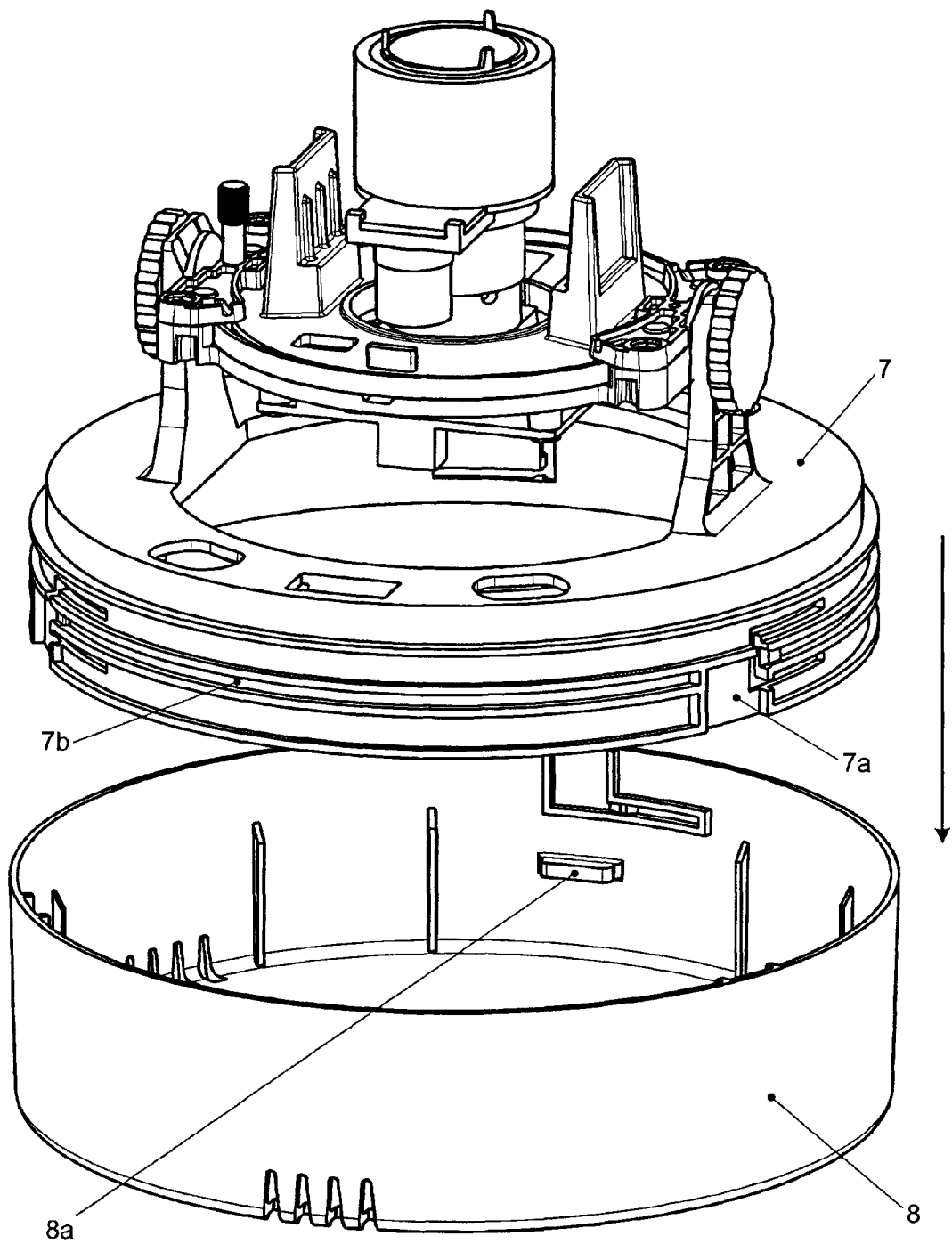
FIG. 2 is an exploded perspective view of part of the camera apparatus.
Figure 3:
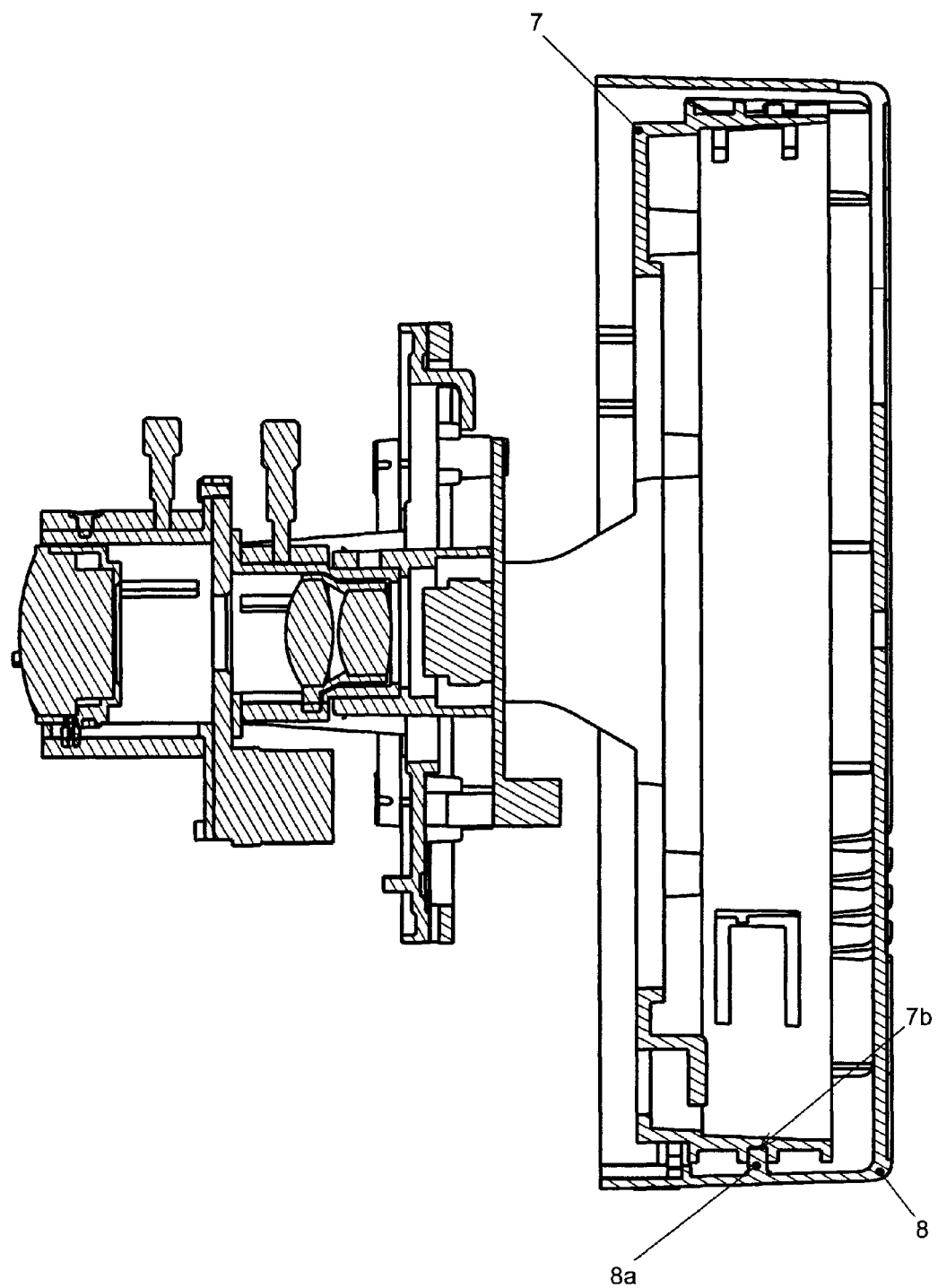
FIG. 3 is a cross sectional view of part of the camera apparatus.

A configuration of each component of a camera apparatus according to a first embodiment is described first. FIG. 1 is a cross sectional view of the camera apparatus; FIG. 2 is an exploded perspective view of a part of the camera apparatus; FIG. 3 is a cross sectional view of a part of the camera apparatus; and FIG. 4 is an exploded perspective view of the camera apparatus.

In FIGS. 1 to 4, reference numeral 1 indicates a lens, reference numeral 2 indicates a dome cover, reference numeral 3 indicates a retaining member for the dome (hereinafter, "retaining member"), reference numeral 4 indicates a rotation lock screw, reference numerals 5 and 11 indicate side pins, reference numeral 6 indicates a tilt lock screw, reference numeral 7 indicates an inner casing, reference numeral 8 indicates a casing, reference numeral 9 indicates a rotating table, and reference numeral 10 indicates a substrate assembly (ASSY) that is a unit in which several elements are combined together. The camera apparatus includes three functional members, namely, an adjusting member, a cover member, and a fixing member.

The adjusting member includes an optical member that has a lens 1 configured by plural lenses. To adjust the pan of the optical member, the adjusting member also includes, for example: the inner casing 7; a lower side pin 5 and an upper side pin 11 attached to the inner casing 7; the rotating table 9 that is attached so as to be sandwiched between the lower side pin 5 and the upper side pin 11; the optical member that includes the lens 1 fixed to the rotating table 9; the substrate assembly 10; the rotation lock screw 4; and the tilt lock screw 6.

Figure 4:
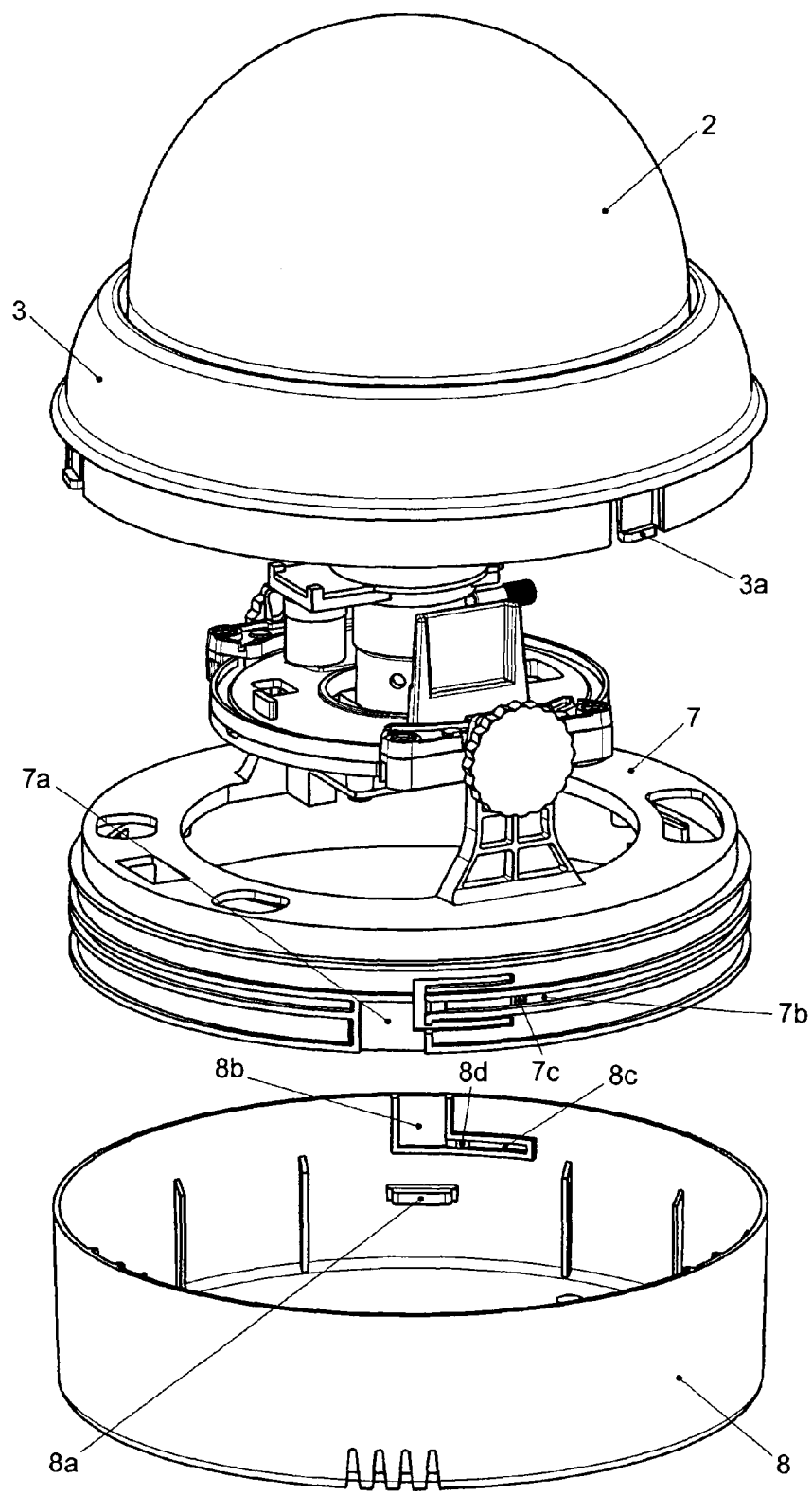
FIG. 4 is an exploded perspective view of the camera apparatus.

As depicted in FIGS. 2 to 4, the inner casing 7 has grooves 7a and 7b for engaging the inner casing 7 with the casing 8. The grooves 7a and 7b are provided along the outer surface of the inner casing 7 and follow a trace of the rotation of the inner casing 7 for pan adjustment. Engaging mechanisms provided along the perimeter of the inner casing 7, rotating with respect to the casing 8, prevent the outer diameter of the camera apparatus from becoming large due to the connection mechanism.

The groove 7a is a portion of a groove and extends from one end of the groove to the edge of a side wall (i.e., the lower edge in FIG. 2 or 4), the groove 7a extending perpendicular to a plane encompassing a trace of the rotation of the inner casing 7. A dimension (in the lateral (horizontal) direction in FIG. 2 or 4) of the groove 7a is slightly greater than a dimension (in the lateral (horizontal) direction in FIG. 2 or 4) of a protrusion 8a, later described, enabling engagement with the protrusion 8a.

The groove 7b (i.e., a portion of the groove other than the groove 7a) follows a trace of the rotation of the inner casing 7, whereby the grooves 7a and 7b form a reversed L-shaped groove. A dimension (in the vertical direction of FIG. 2 or 4) of the groove 7b is slightly greater than a dimension (in the vertical direction of FIG. 2 or 4) of the protrusion 8a, enabling the protrusion 8a to rotate while engaged. In the groove 7b, a projection 7c having a height that is less than the depth of the groove and a resilient property with respect to the direction in which the projection 7c projects is provided.

To make the projection 7c resilient and deformable, the inner casing 7 is formed of a resilient material such as plastic. Further, as depicted in FIG. 4, a notch provided at the end of the groove 7b on the side of the groove 7a makes the projection 7c to be resilient inwards and outwards with respect to the inner casing 7. Thus, without provision on a fixing member functioning as a part of an outer element, the appearance is not deteriorated due to a notch portion exposed to the outside.

As depicted in FIG. 4, the cover member includes, for example, the transparent dome cover 2 and the retaining member 3 for covering the optical member that includes the lens 1. As depicted in FIG. 4, the retaining member 3 has a protrusion 3a for engaging the dome cover 2 and the retaining member 3 (cover member) with the casing 8.

The protrusion 3a is provided along the outer surface of the retaining member 3 and follows a trace of the rotation of the retaining member 3 when being engaged to the casing 8. Each engaging mechanism provided along the perimeter of the retaining member 3, rotating with respect to the casing 8, prevents the outer diameter of the camera apparatus from becoming large due to the connection mechanism.

Three protrusions 3a are provided along the outer surface of the retaining member 3 at given intervals (about 120 degrees). The number of the protrusions 3a is not limited to three, and may be less or more than three. The protrusions 3a need not be provided at given intervals. Each protrusion 3a is resilient with respect to the direction in which the protrusion 3a projects.

To make the protrusions 3a resilient and deformable, the retaining member 3 is formed of a resilient material such as plastic. Further, as depicted in FIG. 4, notches provided at the edge of the retaining member 3 make the protrusions 3a resilient inwards and outwards with respect to the retaining member 3. Thus, without provision on a fixing member functioning as a part of an outer element, the appearance is not deteriorated due to a notch portion exposed to the outside.

The fixing member includes, for example, the casing 8, which is fixed to an installation surface such as a wall, a ceiling, and a pillar. The casing 8 includes an aspect that comes in contact with the installation surface, and a side wall that extends from the perimeter of the aspect that comes in contact with the installation surface. As depicted in FIGS. 2 to 4, the protrusion 8a (first engaging mechanism) for engaging the inner casing 7 with the casing 8 is provided on the inner surface of the side wall of the casing 8.

As depicted in FIG. 4, grooves 8b and 8c (second engaging mechanism) for engaging the retaining member 3 (cover member) with the casing 8 are also provided on the inner surface of a side wall of the casing 8. The first engaging mechanism protrudes and the second engaging mechanism is recessed, thereby preventing the inner casing 7 and the retaining member 3 from being mistaken for one another at assembly and thus, increasing the efficiency of assembly.

The groove 8b extends from one end of a groove to the edge (i.e., the upper end in FIG. 2 or 4) of the inner surface of the side wall, the groove 8b extending perpendicular to a plane encompassing a trace of the rotation of the retaining member 3 for attachment to the casing 8. A dimension (in the lateral (horizontal) direction in FIG. 2 or 4) of the groove 8b is slightly greater than a dimension (in the lateral (horizontal) direction in FIG. 2 or 4) of the protrusion 3a of the retaining member 3, enabling the protrusion 3a to be engaged therewith.

The groove 8c follows a trace of the rotation of the retaining member 3 for attachment to the casing 8, whereby the grooves 8b and 8c form an L-shaped groove. A dimension (in the vertical direction in FIGS. 2 and 4) of the groove 8c is slightly greater than a dimension (in the vertical direction in FIGS. 2 and 4) of the protrusion 3a, enabling the protrusion 3a to rotate while being engaged.

The protrusion 8a is closer to the aspect that comes in contact with the installation surface than the groove 8b in a direction perpendicular to the aspect that comes in contact with the installation surface. Thus, during assembly, the position where the inner casing 7 is to be attached can be easily recognized, thereby increasing the efficiency of assembly.

A procedure of assembling the camera apparatus is described. The adjusting member is assembled by placing the rotating table 9 on two lower side pins 5 that face each other across the rotating table 9, and placing an upper side pin 11 at each of the lower side pins 5 so that the rotating table 9 is sandwiched between the lower side pins 5 and the upper side pins 11. The upper side pin 11 and the lower side pin 5 are fixed by screws. The substrate assembly 10 is attached to the rotating table 9 by screws, and these components are attached to the inner casing 7 and fixed by a tilt lock screw 6 from two sides.

The tip of the rotation lock screw 4 is applied to the rotating table 9 via the upper side pin 11, locking the rotation mechanism. The adjusting member is attached to the casing 8. The lens 1 may be attached after the adjusting member is attached to the casing 8.

To engage the adjusting member with the fixing member, the protrusion 8a (first engaging mechanism) provided on (the inner surface of the side wall of) the casing 8 (fixing member) and the grooves 7a and 7b of the inner casing 7 (adjusting member) are engaged. Specifically, the protrusion 8a is engaged with the groove 7a, and then the inner casing 7 is rotated along the groove 7b with the protrusion 8a being engaged with the groove 7b, whereby the pan of the adjusting member is adjusted.

The projection 7c provided in the groove 7b and having a resilient property can step over the protrusion 8a of the casing 8 and move to the end of the groove 7b. After attachment, even if force is applied to the inner casing 7 in a direction opposite to the rotation direction for attachment to the casing 8, one side of the projection 7c runs into the protrusion 8a and stops the rotation in the opposite direction, thereby preventing the inner casing 7 from easily detaching from the casing 8.

Next, the grooves 8b and 8c (second engaging mechanism) provided on (the inner surface of the side wall of) the casing 8 (fixing member) and the protrusion 3a of the retaining member 3 (cover member) are engaged. Specifically, the protrusion 3a is engaged with the groove 8b, and then the retaining member 3 is rotated along the groove 8c with the protrusion 3a being engaged with the groove 8c, to the end of the groove 8c and is locked at the position, attaching the retaining member 3 to the casing 8.

Even if the retaining member 3 is rotated to be attached to the casing 8, the rotation of the retaining member 3 does not affect the inner casing 7 and thus, the inner casing 7 does not rotate along with the rotation of the retaining member 3. Consequently, the pan of the inner casing 7 that has been already adjusted does not deviate.

In the groove 8c, a projection 8d having a height that is less than the depth of the groove is provided, and the protrusion 3a of the retaining member 3, having a resilient property, can step over the projection 8d and move to the end of the groove 8c. Even if force is applied to the retaining member 3 in a direction opposite to the rotation direction thereof after being attached to the casing 8, one side of the protrusion 3a runs into the projection 8d and stops the rotation in the opposite direction, thereby preventing the retaining member 3 from easily detaching from the casing 8.

As described above, in the camera apparatus according to the first embodiment, after the adjusting member is attached to the fixing member and the pan of the adjusting member is adjusted, the cover member covering the lens can be attached thereto by rotating the cover member without changing the position of the adjusting member that has been already adjusted.

Figure 5:
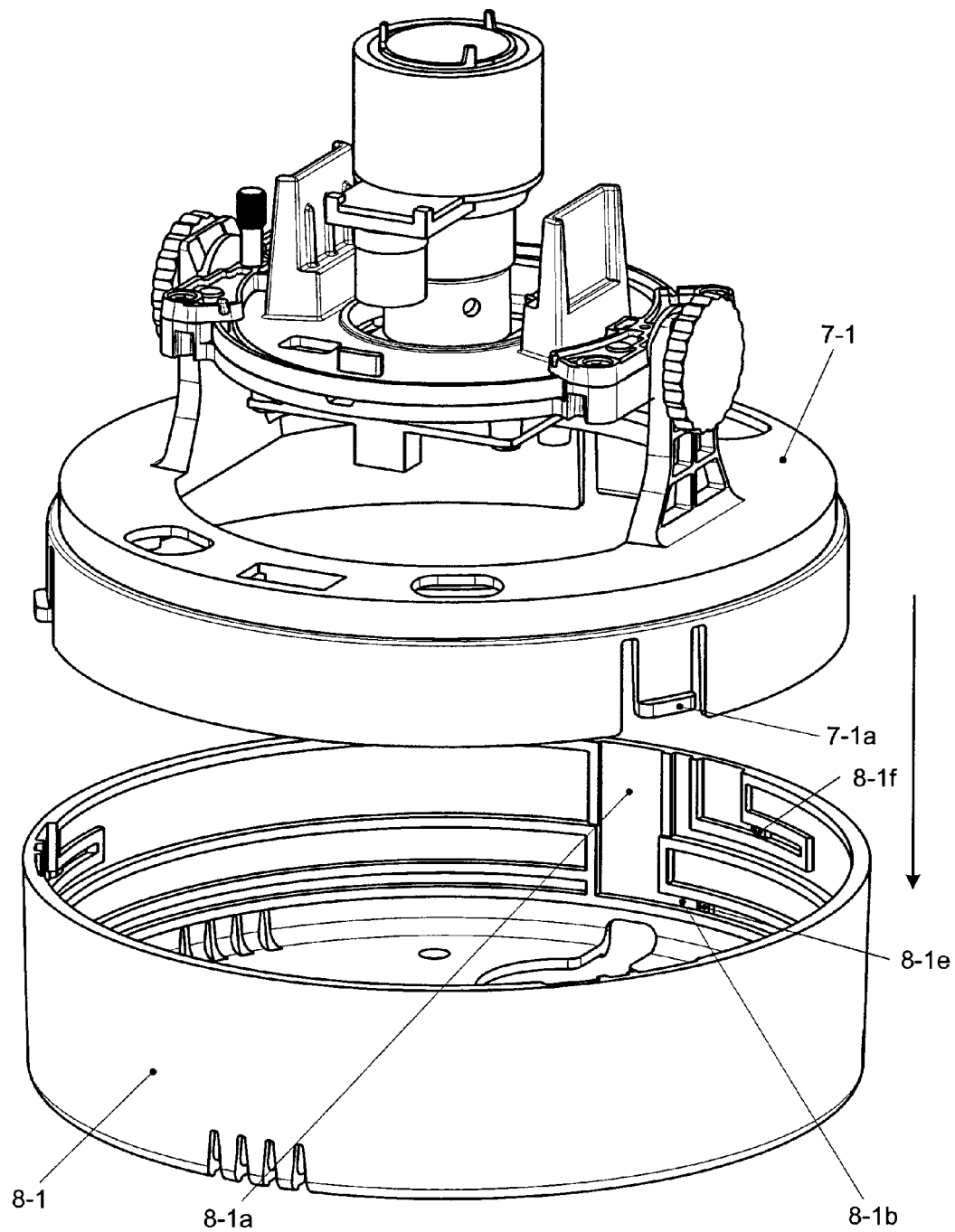
FIG. 5 is an exploded perspective view of part of a camera apparatus according to a second embodiment.
Figure 6:
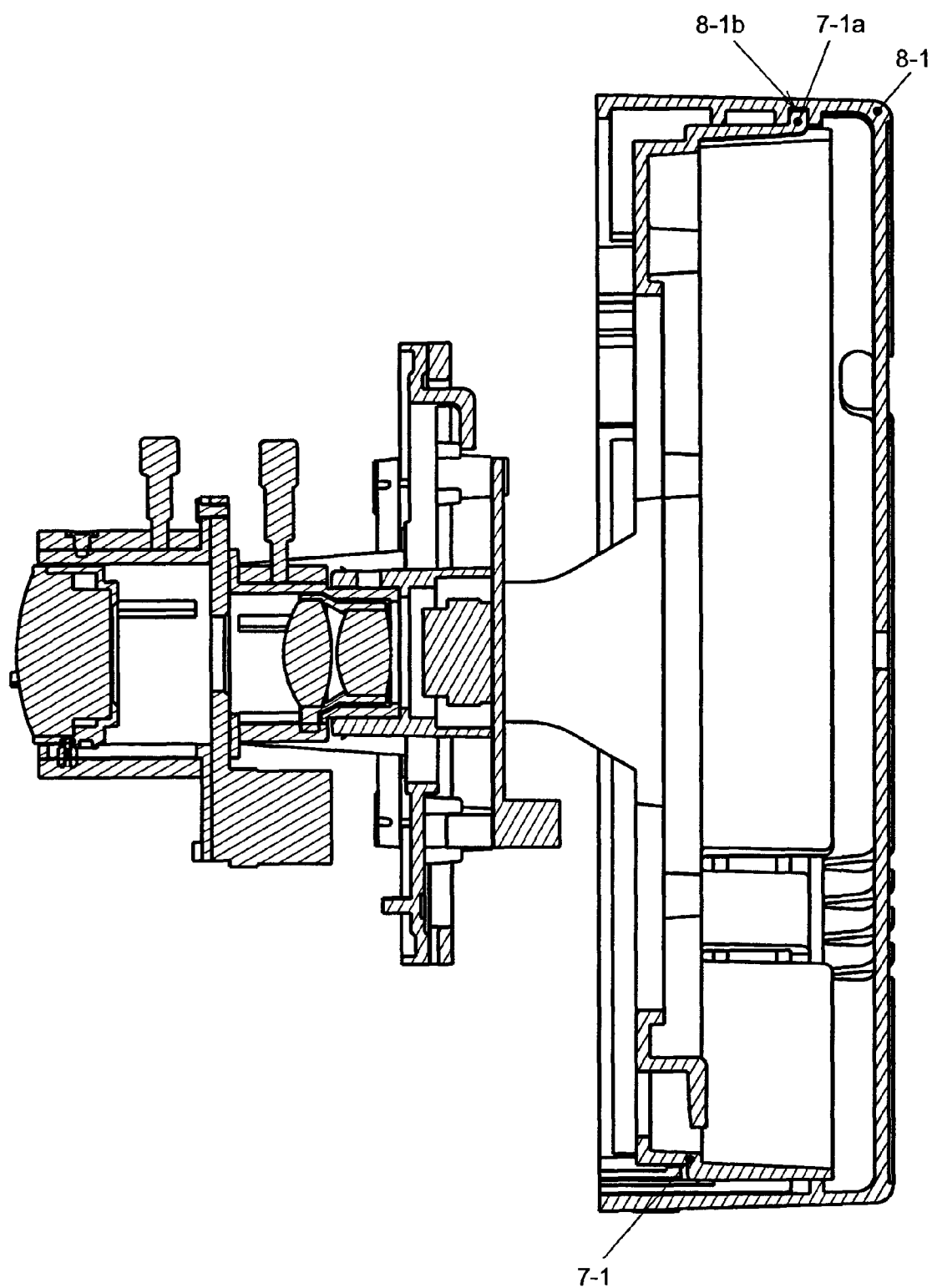
FIG. 6 is a cross section of part of the camera apparatus.

A configuration of each component of a camera apparatus according to a second embodiment is described. FIG. 5 is an exploded perspective view of a part of the camera apparatus; FIG. 6 is a cross section of the part of the camera apparatus; and FIG. 7 is an exploded perspective view of the camera apparatus.

In the first embodiment described above, the protrusion 8a (first engaging mechanism) for engaging the inner casing 7 (adjusting member) to the casing 8 is provided on the inner surface of the side wall of the casing 8 (fixing member). The protrusion 8a is engaged with the grooves 7a and 7b of the inner casing 7 (adjusting member) to engage the adjusting member with the fixing member.

The second embodiment, on the other hand, is different from the first embodiment in that (1) grooves 8-1a and 8-1b (first engaging mechanism) for engaging an inner casing 7-1 (adjusting member) with a casing 8-1 are provided on the inner surface of the side wall of the casing 8-1 (fixing member), and (2) the grooves 8-1a and 8-1b are engaged with a protrusion 7-1a of the inner casing 7-1 (adjusting member) to engage the adjusting member with the fixing member. Other components (including the second engaging mechanism) have the same configuration as in the first embodiment and the description thereof is omitted.

Figure 7:
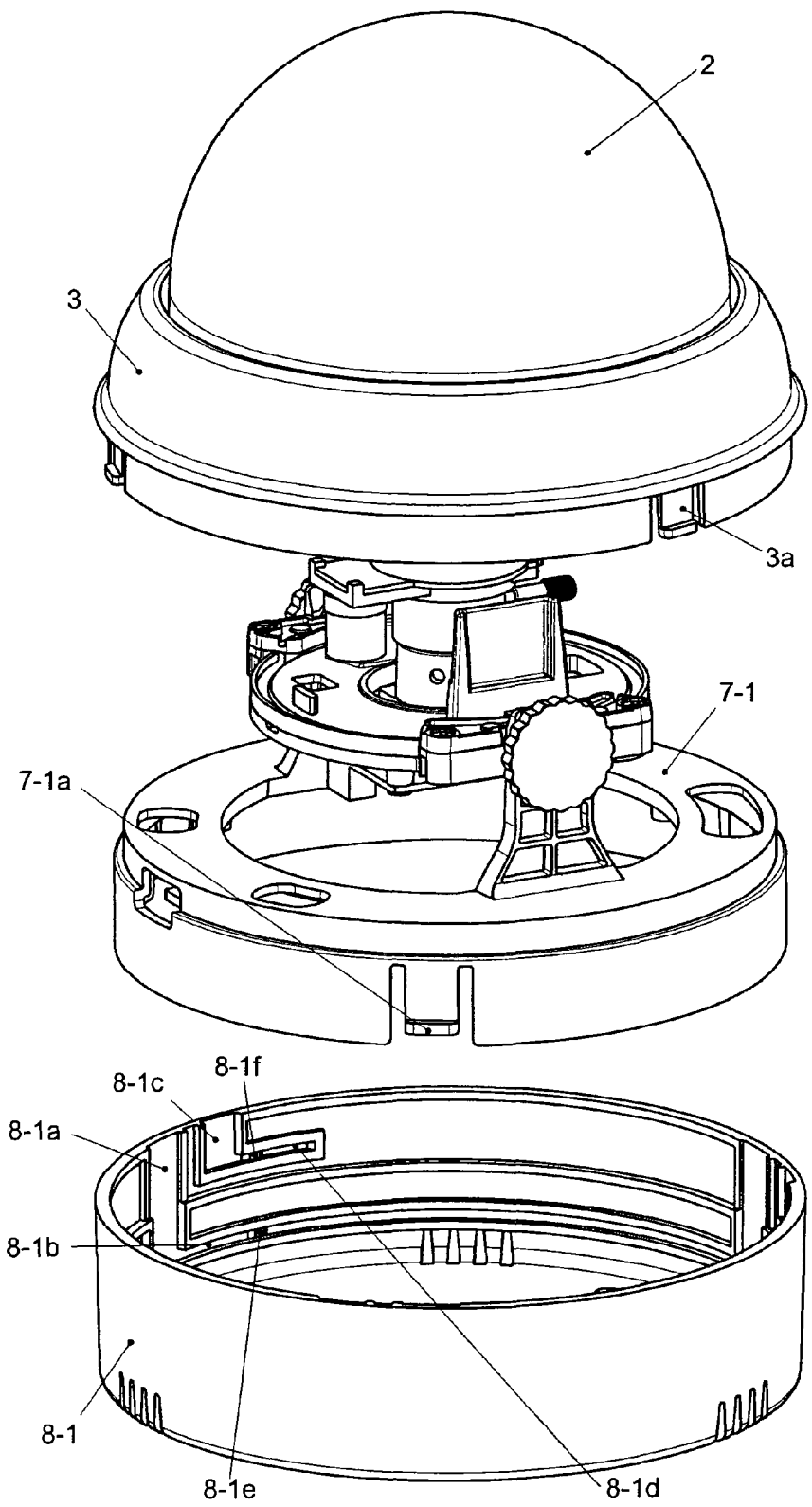
FIG. 7 is an exploded perspective view of the camera apparatus.

As depicted in FIG. 7, the inner casing 7-1 has a protrusion 7-1a (adjusting member) for engaging the inner casing 7-1 to the casing 8-1.

The protrusion 7-1a is provided on the outer surface of the inner casing 7-1 and follows a trace of the rotation of the inner casing 7-1 for engagement with the casing 8-1. Engaging mechanisms provided along the perimeter of the inner casing 7-1, rotating with respect to the casing 8-1, prevent the outer diameter of the camera apparatus from becoming large due to the connection mechanism.

Three protrusions 7-1a are provided along the outer surface of the inner casing 7-1 at given intervals (about 120 degrees). The number of the protrusions 7-1a is not limited to three, and may be less or more than three. The protrusions 7-1a need not be provided at given intervals. Each protrusion 7-1a is resilient with respect to the direction in which the protrusion 7-1a projects.

To make the protrusions 7-1a resilient and deformable, the inner casing 7-1 is formed of a resilient material such as plastic. Further, as depicted in FIG. 7, notches provided at the edge of the inner casing 7-1 make the protrusions 7-1a resilient inwards and outwards with respect to the inner casing 7-1. Thus, without provision on a fixing member functioning as a part of an outer element, the appearance is not deteriorated due to a notch portion exposed to the outside, an advantage that is common to the protrusion 3a of the retaining member 3.

The protrusion 7-1a having a resilient property can step over a projection 8-1e provided in the groove 8-1b and move to the end of the groove 8-1b. After attachment, even if force is applied to the inner casing 7-1 in a direction opposite to the rotation direction for attachment to the casing 8-1, one side of the protrusion 7-1a runs into the projection 8-1e and stops the rotation in the opposite direction, thereby preventing the inner casing 7-1 from easily detaching from the casing 8-1.

As depicted in FIGS. 5 to 7, the grooves 8-1a and 8-1b (first engaging mechanism) for engaging the inner casing 7-1 with the casing 8-1 are provided on the inner surface of the side wall of the casing 8-1. As depicted in FIG. 7, grooves 8-1c and 8-1d (second engaging mechanism) for engaging the retaining member 3 (cover member) with the casing 8-1 are also provided on the inner surface of a side wall of the casing 8-1.

The protrusion 3a having a resilient property can step over a projection 8-1f provided in the groove 8-1d and move to the end of the groove 8-1d. After attachment, even if force is applied to the cover member in a direction opposite to the rotation direction for attachment to the casing 8-1, one side of the projection 8-1f runs into the protrusion 3a and stops the rotation in the opposite direction, thereby preventing the cover member from easily detaching from the casing 8-1.

The groove 8-1a extends from one end of a groove to the edge (i.e., the upper end in FIG. 5 or 7) of the inner surface of the side wall, the groove 8-1a extending perpendicular to a plane encompassing a trace of the rotation of the inner casing 7-1 for attachment to the casing 8-1. A dimension (in the lateral (horizontal) direction in FIGS. 5 and 7) of the groove 8-1a is slightly greater than a dimension (in the lateral (horizontal) direction in FIGS. 5 and 7) of the protrusion 7-1a of the inner casing 7-1, enabling the protrusion 7-1a to be engaged thereto.

The groove 8-1b follows a trace of the rotation of the inner casing 7-1 for attachment to the casing 8-1, whereby the grooves 8-1a and 8-1b form an L-shaped groove. A dimension of the groove 8-1b (in the vertical direction in FIGS. 5 and 7) is slightly greater than a dimension (in the vertical direction in FIGS. 5 and 7) of the protrusion 7-1a, enabling the protrusion 7-1a to rotate while being engaged.

The grooves 8-1c and 8-1d are similar to the grooves 8b and 8c according to the first embodiment and the description thereof is omitted. A dimension (in the lateral (horizontal) direction in FIG. 7) of the protrusion 7-1a is greater than a dimension (in the lateral (horizontal) direction in FIG. 7) of the protrusion 3a. Accordingly, a dimension (in the lateral (horizontal) direction in FIGS. 5 and 7) of the groove 8-1a is greater than a dimension (in the lateral (horizontal) direction in FIGS. 5 and 7) of the groove 8-1c.

A dimension (in the lateral (horizontal) direction in FIGS. 5 and 7) of the protrusion 7-1a is also greater than that of the groove 8-1c, thereby preventing the assembly worker from errantly engaging the protrusion 7-1a and the groove 8-1c.

As discerned from the first and the second embodiments, a protrusion or a groove may be formed on the fixing member (casing 8) as the first and the second engaging mechanisms. If a protrusion and a groove are formed on the fixing member as the first engaging mechanism, a groove and a protrusion are formed on the adjusting member (inner casing 7), respectively.

The second engaging mechanism is similar to the first engaging mechanism, and if a protrusion and a groove are formed on the fixing member as the second engaging mechanism, a groove and a protrusion are formed on the cover member (retaining member 3).

Figure 8:
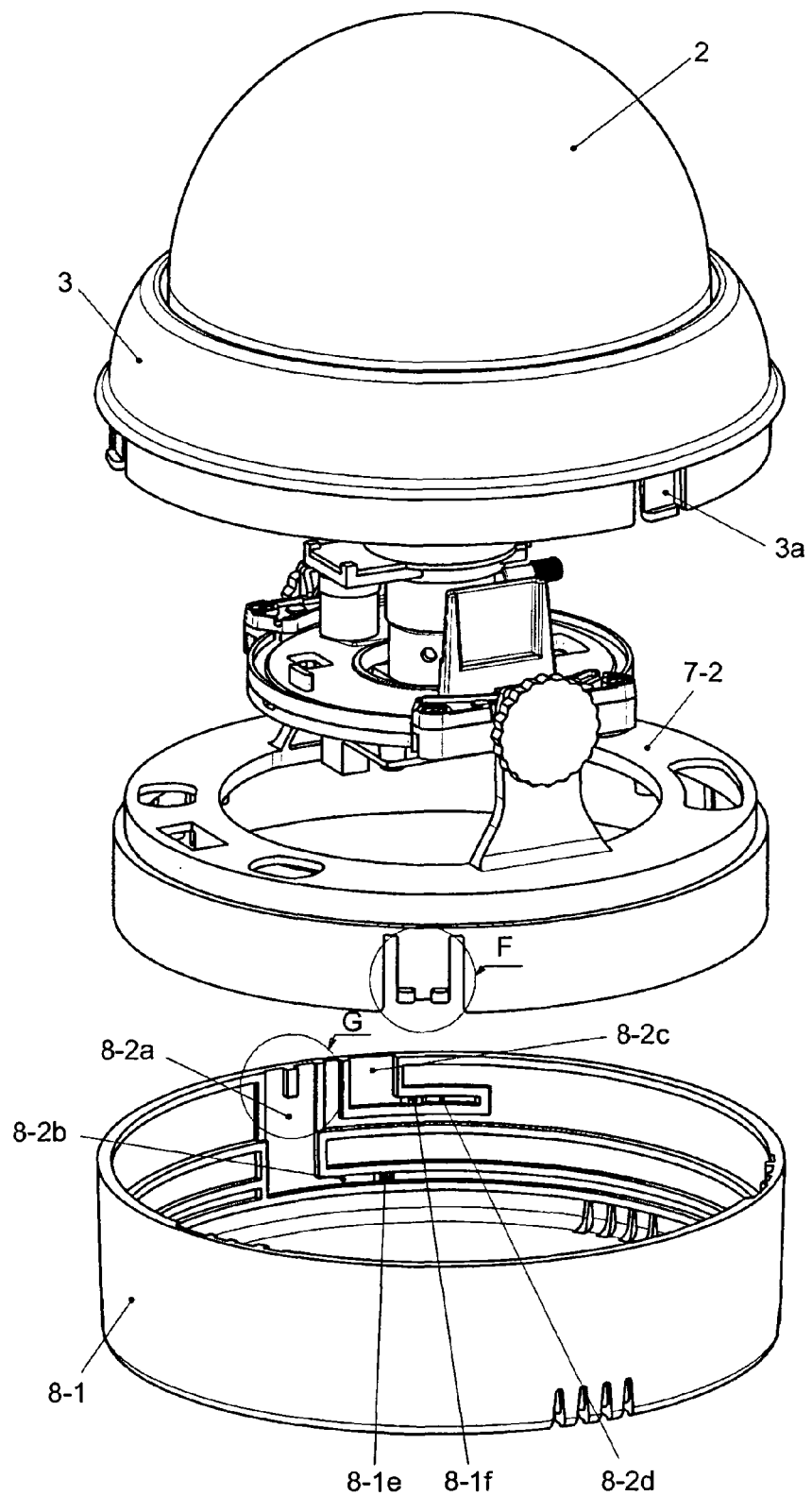
FIG. 8 is an exploded perspective view of a camera apparatus according to a third embodiment.
Figure 9:
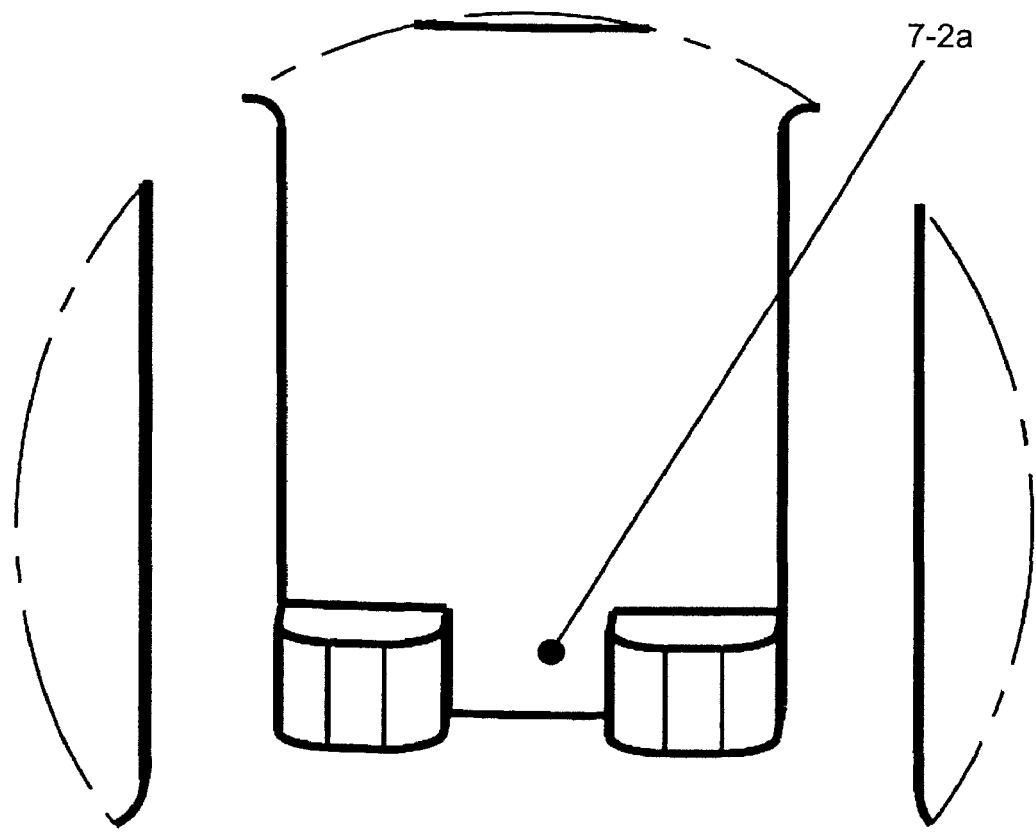
FIG. 9 is an enlarged view of an F portion of the camera apparatus.

A configuration of each component of a camera apparatus according to a third embodiment is described. FIG. 8 is an exploded perspective view of the camera apparatus; FIG. 9 is an enlarged view of an F portion of the camera apparatus; and FIG. 10 is an enlarged view of a G portion of the camera apparatus.

Figure 10:
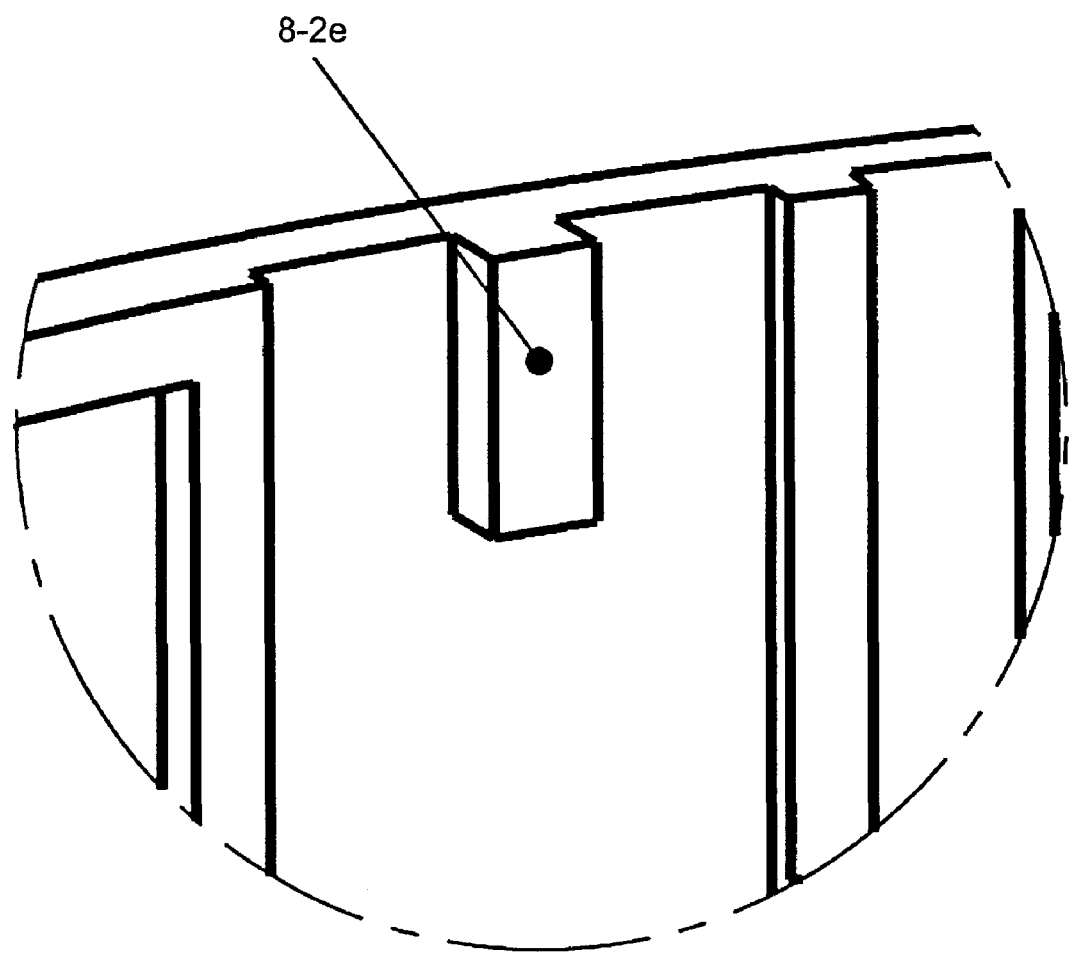
FIG. 10 is an enlarged view of a G portion of the camera apparatus.

The third embodiment is a variation of the second embodiment described above, and different from the second embodiment in the shape of the protrusion of the inner casing (i.e., F portion in FIGS. 8 and 9) and the groove (first engaging mechanism) of the cover (i.e., G portion in FIGS. 8 and 10). Other components have the same configuration as in the second embodiment and description thereof is omitted.

As depicted in FIG. 9, a recess (notch portion) of a given width is formed on the center of a protrusion 7-2a and as depicted in FIG. 10, a projection 8-2e is provided at the center of one end of the groove 8-2a. The width of the recess (notch portion) of the protrusion 7-2a (in the lateral (horizontal) direction in FIGS. 8 and 9) is slightly greater than that of the projection 8-2e depicted in FIGS. 8 and 10, so that the protrusion 7-2a, when being engaged with the projection 8-2e, passes through the groove 8-2a to the groove 8-2b without running into the projection 8-2e.

A dimension of the groove 8-2a (in the lateral (horizontal) direction in FIG. 8) is greater than that of the protrusion 3a of the retaining member 3. However, the protrusion 3a cannot pass through the groove 8-2a to the groove 8-2b due to the projection 8-2e.

Thus, from the shapes of the protrusion 7-2a (notch portion) and the groove 8-2a (projection 8-2e), the assembly worker of the camera apparatus according to the third embodiment can easily know, when attaching the inner casing 7-2 to the casing 8-1, that the protrusion 7-2a should be engaged to the groove 8-2a. Thus, errant positioning of the inner casing 7-2 is prevented, thereby increasing the efficiency of assembly.

When attaching the inner casing 7-2 to the casing 8-1, the assembly worker is prevented from errantly forcing the protrusion 7-2a into the groove 8-2c and breaking the protrusion 7-2a and/or the groove 8-2c. The groove 8-2d depicted in FIG. 8 is provided on the inner surface of the side wall of the casing 8-1, and together with the groove 8-2c, forms the second engaging mechanism for engaging the retaining member 3 (cover member) to the casing 8-1.

Figure 11:
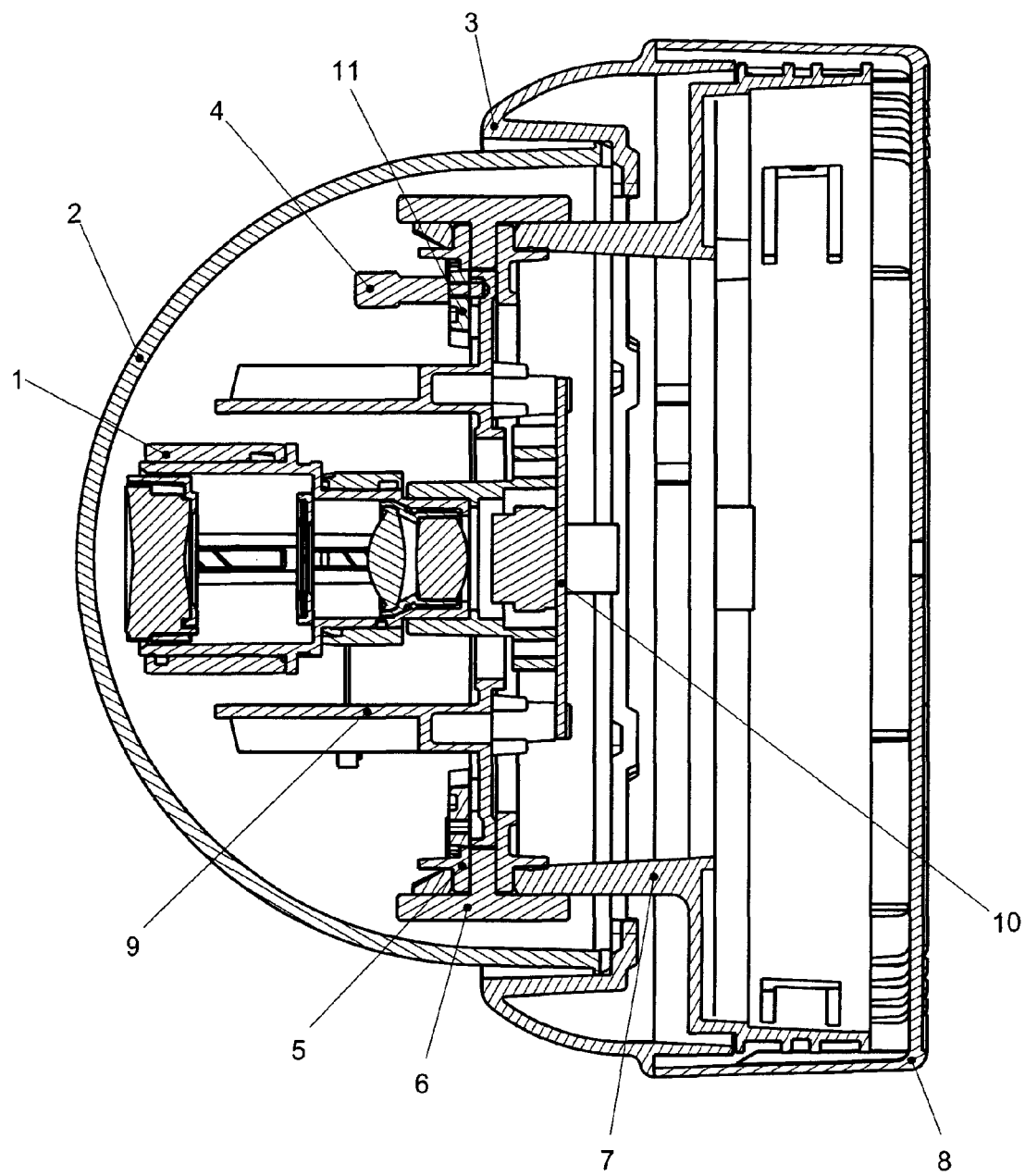
FIG. 11 is a cross sectional view of a camera apparatus according to a fourth embodiment.
Figure 12:
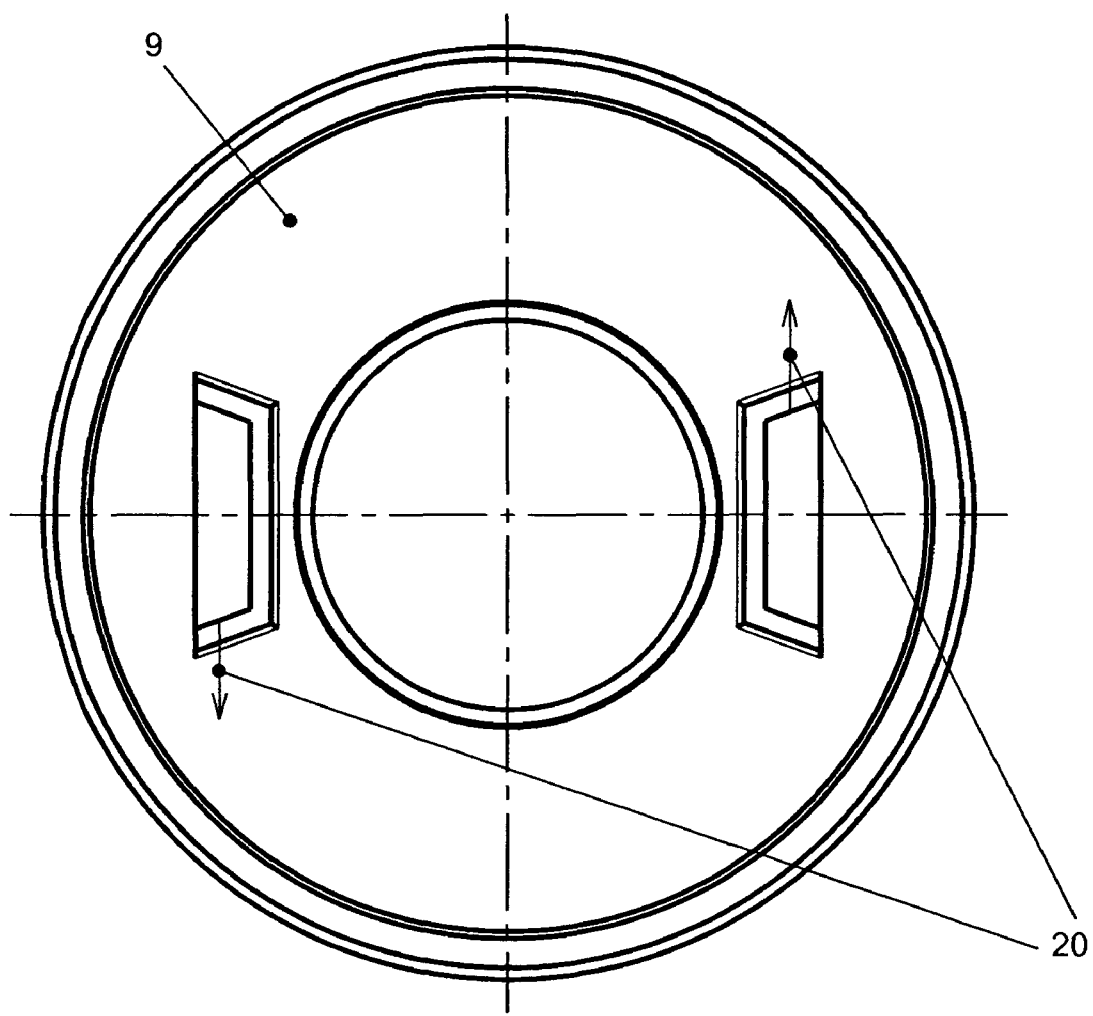
FIG. 12 is a front view of a rotating table of the camera apparatus.
Figure 13:
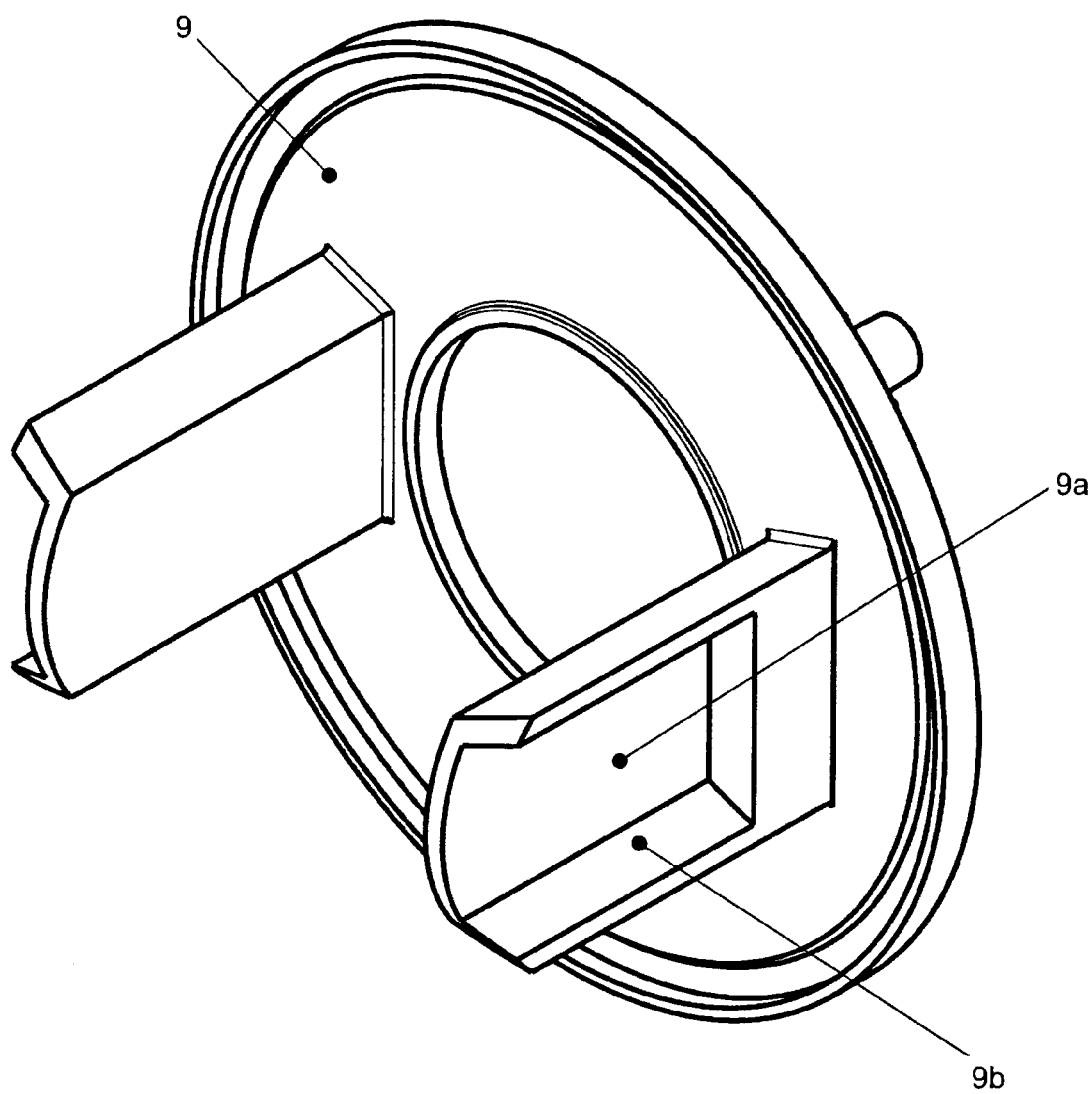
FIG. 13 is a perspective view of the rotating table of the camera apparatus.

A configuration of each component of a camera apparatus according to a fourth embodiment is described. FIG. 11 is a cross sectional view of the camera apparatus; FIG. 12 is a front view of the rotating table of the camera apparatus; FIG. 13 is a perspective view of the rotating table of the camera apparatus; and FIG. 14 is a perspective view of a part of the camera apparatus.

In the first to the third embodiments, the assembly worker directly holds the lens 1 during the lens adjustment such as tilt and rotation, thereby placing a load on the lens 1. The load may cause lens instability that in turn causes poor imaging. Additional load can break the lens 1.

Thus, the camera apparatus according to the fourth embodiment depicted in FIG. 11 includes a rib 9a on the rotating table 9. The camera apparatus according to the fourth embodiment is different from that according to the first embodiment depicted in FIG. 1 only in the shape of the rotating table 9. Other components have the same configuration as in the first embodiment and description thereof is omitted.

Figure 14:
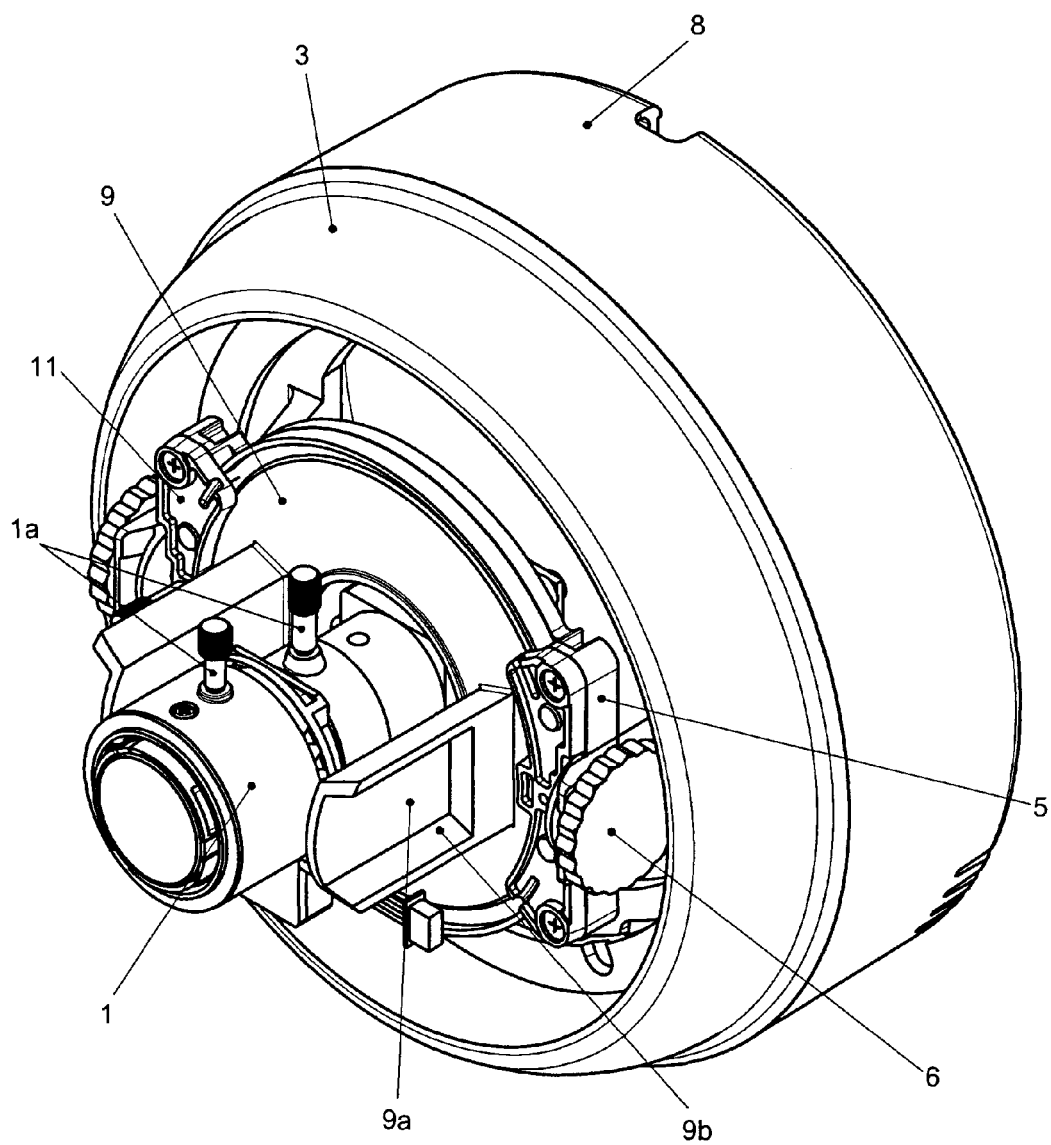
FIG. 14 is a perspective view of part of the camera apparatus.

As depicted in FIGS. 12 to 14, two ribs 9a are provided on the rotating table 9. The ribs 9a and the rotating table 9 are integrally formed. The ribs 9a are provided in an area so as to not interfere with a manipulation of the pins 1a provided along the perimeter of the lens 1 for adjusting and locking the focus and the zoom position, and sandwich the lens 1 equipped on the camera apparatus from two sides of the lens 1. Each rib has a substantially U-shape, and the assembly worker holds the lens 1 with his/her thumb and index finger on the inner surface of the bottom of each of the U-shaped ribs 9a that face each other across the lens 1.

In this state, the assembly worker moves an inner surface 9b of the U-shaped rib 9a, which crosses the direction in which the worker, using the sides of his/her fingers, applies a force to the rotating table 9 for lens adjustment such as tilt and rotation in the directions indicated by an arrow 20 or the opposite direction thereof, thereby performing the lens adjustment such as tilt and rotation. Thus, as discerned from FIG. 14, the tilt and the rotation of the lens 1 can be adjusted without directly touching the lens 1, thereby preventing undue load to the lens 1.

Thus, the fourth embodiment can prevent lens instability caused by directly touching the lens 1, poor imaging caused by the lens instability, and the breakage of the lens 1 due to a strong force thereto without an increase in the number of elements and consequently, without an increase in labor and cost.

Figure 15:
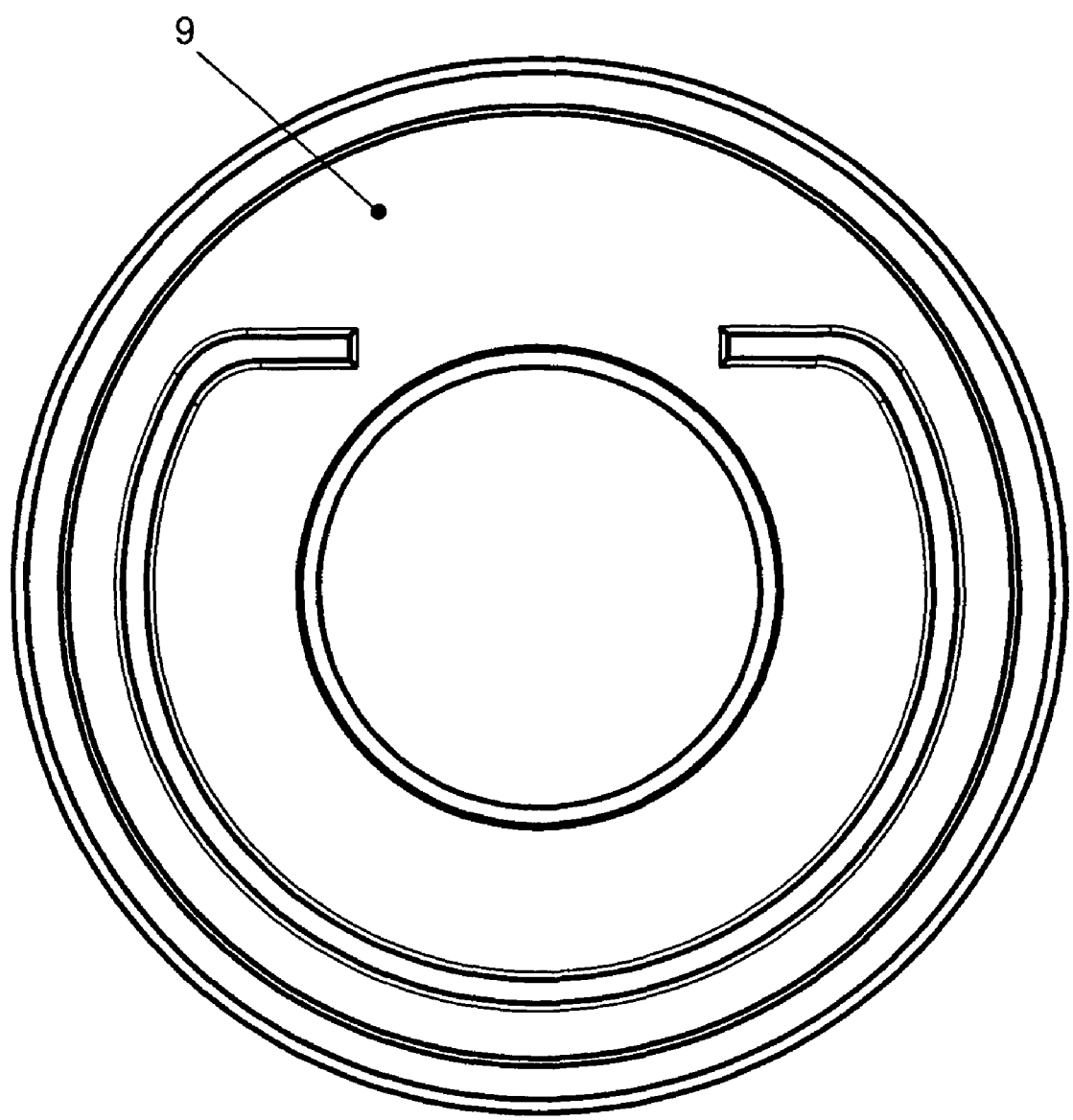
FIG. 15 is a front view of a rotating table of a camera apparatus according to a fifth embodiment.
Figure 16:
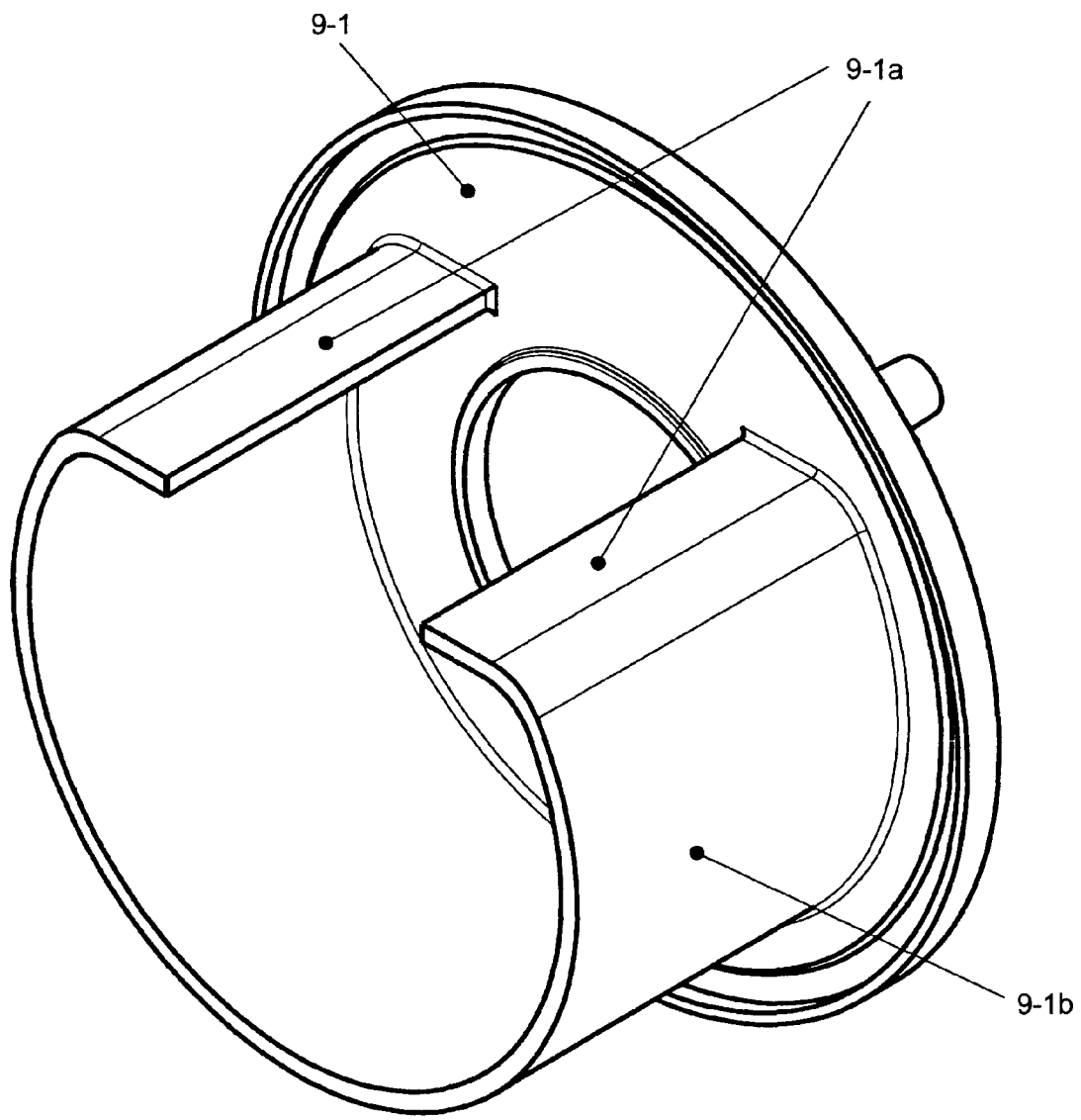
FIG. 16 is a perspective view of the rotating table of the camera apparatus.
Figure 17:
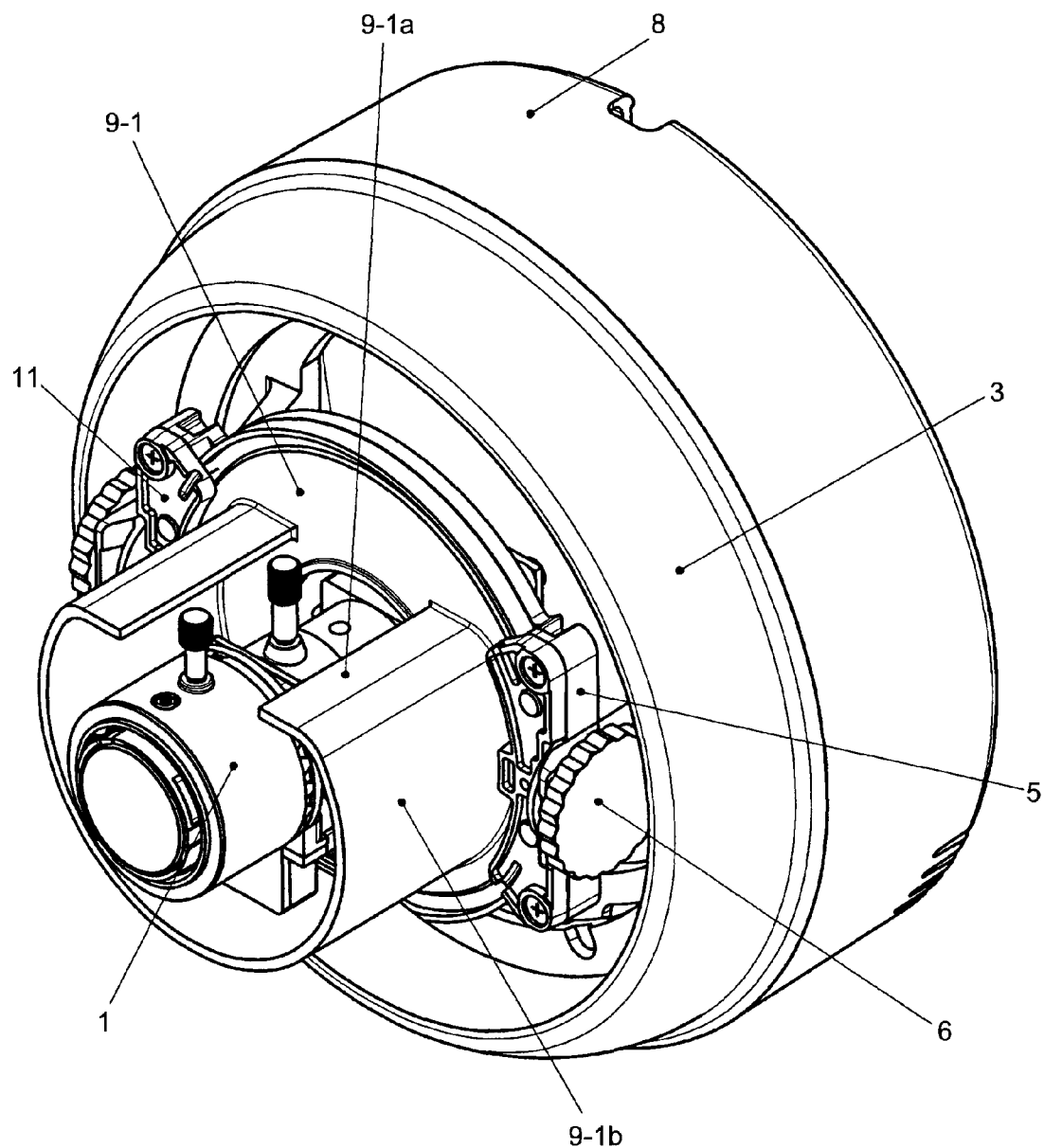
FIG. 17 is a perspective view of a part of the camera apparatus.

A configuration of each component of a camera apparatus according to a fifth embodiment is described. FIG. 15 is a front view of a rotating table of the camera apparatus; FIG. 16 is a perspective view of the rotating table of the camera apparatus; and FIG. 17 is a perspective view of a part of the camera apparatus.

The fifth embodiment is a variation of the fourth embodiment. In the fourth embodiment, to prevent direct handling of the lens 1, two ribs 9a are provided for the thumb and the index finger. In the fifth embodiment, to prevent direct handling of the lens 1 (similarly to the fourth embodiment), one curved rib is formed along a rotating table 9-1, with both ends being folded inward, and functioning as grasping portions 9-1a to which the index finger and the middle finger are applied. Thus, the rib according to the fifth embodiment includes the grasping portions 9-1a and a curved peripheral portion 9-1b.

The assembly worker holds the rib with the index finger and the middle finger applied to the grasping portions 9-1a and the thumb applied to the peripheral portion 9-1b. By holding the rib with these three digits, the assembly worker adjusts the tilt of the lens 1 and the rotation of the lens 1 by rotating the rotating table 9-1. The rib can be more stably held by three digits, and fine adjustment can be performed more efficiently.

Other than the shape of the rib, the fifth embodiment has a similar configuration to the fourth embodiment and description thereof is omitted.

The camera apparatus according to the present invention maintains an overall size that is compact, has a favorable appearance, and prevents displacement of the adjusting member after setting, such as with joint rotation with the cover member attached thereto, thereby increasing the efficiency of the assembly and installation of the camera apparatus.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A camera apparatus comprising:
an adjusting member configured to adjust a pan of an optical member included therein;
a cover member configured to cover the optical member; and
a fixing member configured to be fixed to an installation surface, the fixing member having an aspect of the fixing member that is configured to come in contact with the installation surface,
wherein the fixing member comprises a first engaging mechanism and a second engaging mechanism for respectively engaging the adjusting member and the cover member thereto,
wherein the pan of the optical member is adjusted by engaging a protrusion of the first engaging mechanism and a groove of the adjusting member, and rotating the adjusting member along the groove of the adjusting member,
wherein the cover member is locked to the fixing member by engaging a groove of the second engaging mechanism and a protrusion of the cover member, and rotating the cover member by a given angle along the groove of the second engaging mechanism,
wherein the groove of the second engaging mechanism has a portion extending from one end of the groove of the second engaging mechanism and perpendicular to a plane encompassing a trace of rotation of the cover member for attachment of the cover member to the fixing member, and
wherein the protrusion of the first engaging mechanism is closer to the aspect of the fixing member than the portion extending from the one end of the groove of the second engaging mechanism in a direction perpendicular to the aspect of the fixing member.

2. The camera apparatus according to claim 1, wherein the protrusion of the cover member is resilient with respect to a direction in which the protrusion projects such that the protrusion of the cover member is configured to step over a projection provided in the groove of the second engaging mechanism and moves to another end of the groove of the second engaging mechanism.

3. The camera apparatus according to claim 1, wherein the portion extending from the one end of the groove of the second engaging mechanism extends to a edge of an inner surface of a side wall of the fixing member.

4. A camera apparatus comprising:
an adjusting member configured to adjust a pan of an optical member included therein;
a cover member configured to cover the optical member; and
a fixing member configured to be fixed to an installation surface, wherein the fixing member comprises a first engaging mechanism and a second engaging mechanism for respectively engaging the adjusting member and the cover member thereto,
wherein the pan of the optical member is adjusted by engaging a groove of the first engaging mechanism and a protrusion of the adjusting member, and rotating the adjusting member along the groove of the first engaging mechanism,
wherein the cover member is locked to the fixing member by engaging a groove of the second engaging mechanism and a protrusion of the cover member, and rotating the cover member by a given angle along the groove of the second engaging mechanism,
wherein the groove of the first engaging mechanism has a first portion extending from one end of the groove of the first engaging mechanism and perpendicular to a plane encompassing a trace of the rotation of the adjusting member for attachment of the adjusting member to the fixing member,
wherein the groove of the second engaging mechanism has a second portion extending from one end of the groove of the second engaging mechanism and perpendicular to a plane encompassing a trace of the rotation of the cover member for attachment of the cover member to the fixing member, and
wherein the first portion is arranged close to the second portion and extends longer than the second portion.

5. The camera apparatus according to claim 4, wherein the protrusion of the adjusting member is resilient with respect to a direction in which the protrusion of the adjusting member projects such that the protrusion of the adjusting member steps over a projection provided in the groove of the first engaging mechanism and moves to another end of the groove of the first engaging mechanism.

6. The camera apparatus according to claim 4, wherein the protrusion of the cover member is resilient with respect to a direction in which the protrusion of the cover member projects such that the protrusion of the cover member steps over a projection provided in the groove of the second engaging mechanism and moves to another end of the groove of the second engaging mechanism.

7. The camera apparatus according to claim 4, wherein the first portion extends to an edge of an inner surface of a side wall of the fixing member.

8. The camera apparatus according to claim 4, wherein the second portion extends to an edge of an inner surface of a side wall of the fixing member.

9. The camera apparatus according to claim 4, wherein a dimension in a lateral direction of the first portion is different from that of the second portion.

10. The camera apparatus according to claim 4, wherein a recess of a given width is formed on a center of the protrusion of the adjusting member,
wherein a projection is provided at a center of the groove of the first engaging mechanism, and
wherein the protrusion of the adjusting member, when being engaged with the projection at the center of the groove of the first engaging mechanism, is configured to pass through the groove of the first engaging mechanism without running into the projection at the center of the groove of the first engaging mechanism.

* * * * *